United States Patent [19]

Wirt

[11] 4,236,598
[45] Dec. 2, 1980

[54] ROTATING SELF-CLEANING SOUND ABSORBER FOR DUCTS

[75] Inventor: Leslie S. Wirt, Newhall, Calif.

[73] Assignee: Lockheed Corporation, Burbank, Calif.

[21] Appl. No.: 913,045

[22] Filed: Jun. 6, 1978

[51] Int. Cl.³ .............. F01N 1/02; F01N 1/18; F01N 3/02
[52] U.S. Cl. .................. 181/231; 181/276; 181/277; 181/224; 55/400
[58] Field of Search .............. 181/212, 214, 219, 224, 181/264, 268, 276, 277, 279, 281, 211, 231; 138/40, 42, 43; 55/DIG. 21, DIG. 30, 276, 400

[56] References Cited

U.S. PATENT DOCUMENTS

| 771,070 | 9/1904 | Hewitt | 181/277 |
|---|---|---|---|
| 832,124 | 10/1906 | Farmer | 181/277 |
| 867,973 | 10/1907 | Hoover | 181/277 |
| 901,237 | 10/1908 | Graumuller | 55/400 |
| 1,477,816 | 12/1923 | Farrand | 181/277 |
| 1,761,971 | 6/1930 | Cram | 181/264 |
| 2,373,231 | 4/1945 | Demuth | 181/264 |
| 2,586,692 | 2/1952 | Morel | 55/400 |
| 3,000,465 | 9/1961 | Bruno | 181/277 |
| 3,071,160 | 1/1963 | Weichbrod | 138/40 |
| 3,688,476 | 9/1972 | Lenawe | 55/276 |
| 3,805,495 | 4/1974 | Steel | 181/237 |
| 3,913,702 | 10/1975 | Wirt et al. | 181/286 |
| 4,137,992 | 2/1979 | Herman | 181/286 X |

Primary Examiner—George H. Miller, Jr.
Assistant Examiner—Benjamin R. Fuller
Attorney, Agent, or Firm—Frederic P. Smith

[57] ABSTRACT

A sound absorbing structure for a flow duct composed of a bundle of parallel, terminated, acoustical waveguides. The bundle of waveguides is cut obliquely so that the individual waveguides vary substantially in length along the cut. The bundle is arranged within a structure which is revolvable about its longitudinal axis. The exterior surface of the structure is spaced from the interior wall of the duct. The longitudinal axis of each of the waveguides is located substantially perpendicular to the axis of revolution. The structure revolves during passage of gas through the duct.

6 Claims, 7 Drawing Figures

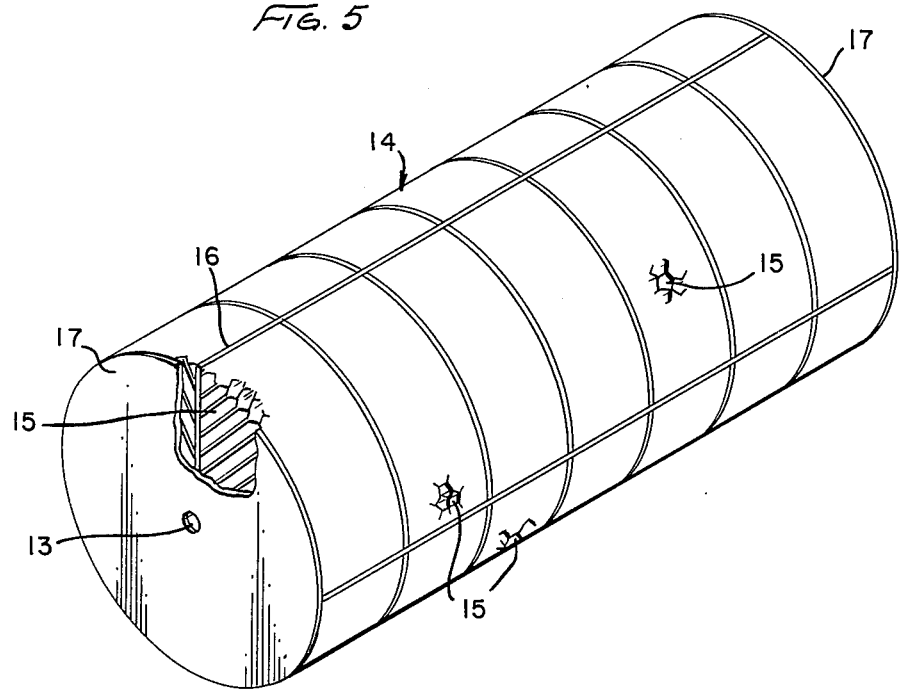
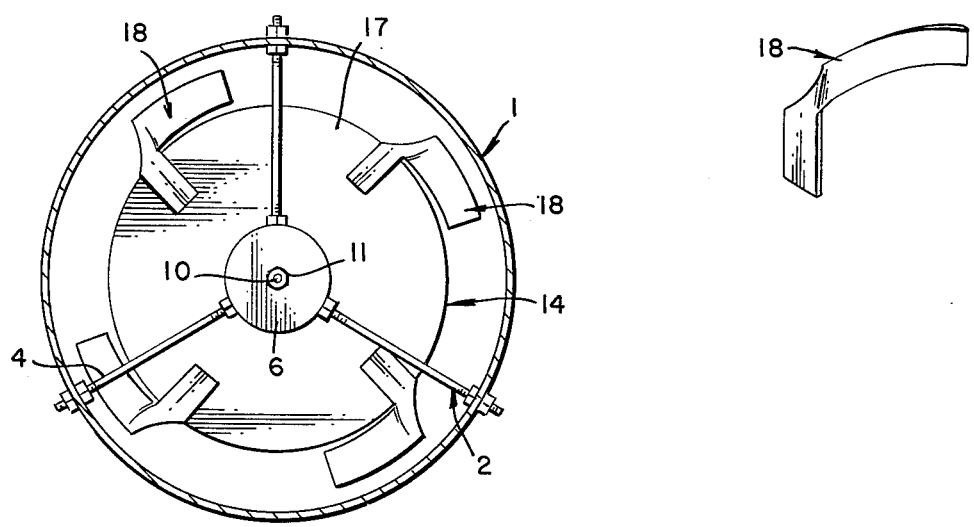

ROTATING SELF-CLEANING SOUND ABSORBER FOR DUCTS

BACKGROUND OF THE INVENTION

The field of this invention relates to sound absorbers and more particularly to a sound absorber which is composed of a plurality of parallel, terminated, acoustical waveguides which are grouped into a bundle and located within a structure mounted within a gas passage duct.

In many ducts, such as air conditioning ducts, gas turbine inlet or exhaust ducts, and the like, it is desirable to attenuate the sound transmitted in the duct while at the same time permitting flow passage with a minimum back pressure. In the past, it has been customary to line the interior wall of the ducts with acoustical material to absorb unwanted sound or to locate a sound attenuating structure along the longitudinal center axis of the duct. Previous sound absorbing structures are capable of efficiently absorbing the sound, so long as they are dry and clean, but fail to absorb sound if dirty or wet and hence are often unsatisfactory.

Gas flow within ducts or passages frequently include particles of dust and dirt and/or small particles of moisture or other liquid. Previously, the most common types of sound absorbing material have been some form of fiberglass matting, loosely packed fibrous material, or the like. Thus a sound attenuator, when constantly subjected to a gas which contains particles of dirt, dust, or liquids becomes clogged and the sound absorption effectiveness is significantly decreased. After a certain period of time, the effectiveness has been diminished to such an extent that it is necessary to clean or replace the attenuator.

Previously, there have been other types of sound absorbers which are not constructed in the form of a mat, foam, or a loosely packed material, but which take the form of a solid cellular structure. An example of such a structure is shown in U.S. Pat. No. 3,913,702, issued Oct. 21, 1975, by Leslie S. Wirt and Duane L. Morrow, entitled CELLULAR SOUND ABSORPTIVE STRUCTURE. The sound absorptive structure of the aforesaid patent is composed of a bundle of parallel, terminated acoustical waveguides with the inner end of the waveguides terminating upon an oblique planar member. A sound wave arriving at the open end of the bundle of waveguides will encounter at least one waveguide which is effectively resonant at the frequency of the arriving wave. Therefore, there is always a waveguide available to absorb sound over a wide range of sound frequencies. A structure of this type has been found to be quite efficient at absorbing sound. However, there has been one problem in that in the fixedly mounting of the aforesaid patented sound absorber, within a gas passage which contains minute material particles, it will be found that over a period of time, the absorber becomes clogged and its effectiveness is diminished. If the open ends of the waveguides are disposed above the closed ends, they cannot dump or drain the dirt or liquids.

SUMMARY OF THE INVENTION

The sound absorbing structure of this invention can be constructed into several configurations. A typical configuration is in the shape of a cylinder having an opening through the structure coinciding with the longitudinal center axis of the duct in which it is to be installed. The structure is formed to include a substantial number of parallel, elongated cells or acoustical waveguides. Each of the cells terminate at a plate which intersects the longitudinal center axis of each cell at an acute angle, preferably within the range of forty-five to sixty degrees. The open end of each of the cells is located at the exterior surface of the structure. A bearing member, such as an elongated rod, passes through the central opening of the structure. The structure is capable of rotation about the rod. The rod is fixedly positioned by mounting brackets within a gas passage duct, such as an air conditioning duct, so that the exterior surface of the structure is spaced from the interior wall surface of the duct. Normally, the spacing will be even between the exterior surface of the structure and the interior wall surface of the duct. Means may be incorporated to rotate the structure, such as a plurality of fins, which when impinged upon by the gas passing through the duct will produce rotationalmovement of the structure.

It is the principal objective of this invention to employ a structure of the type described within the aforesaid patent, mount such within a gas passage duct, and if minute particles of material are continuously being conducted along with the gas, these particles are not able to collect within the structure and hinder the operating effectiveness of the structure.

BRIEF DESCRIPTION OF THE DRAWINGS

FIG. 5 is an isometric view of the sound absorbing structure constructed in accordance with the invention;

FIG. 6 is a view similar to FIG. 2, but with the sound absorbing structure including fins which function to effect rotation of the structure within the duct; and FIG. 7 is an isometric view of a single fin which is shown attached to the sound absorbing structure in FIG. 6.

DETAILED DESCRIPTION OF THE SHOWN EMBODIMENT

Figure 1:
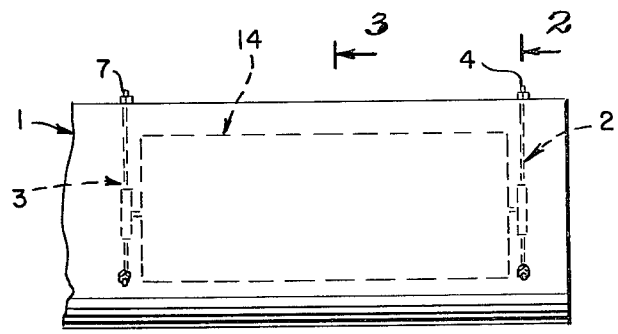
FIG. 1 is an elevational view of a typical duct within which is to be mounted the sound absorbing structure of this invention.
Figure 2:
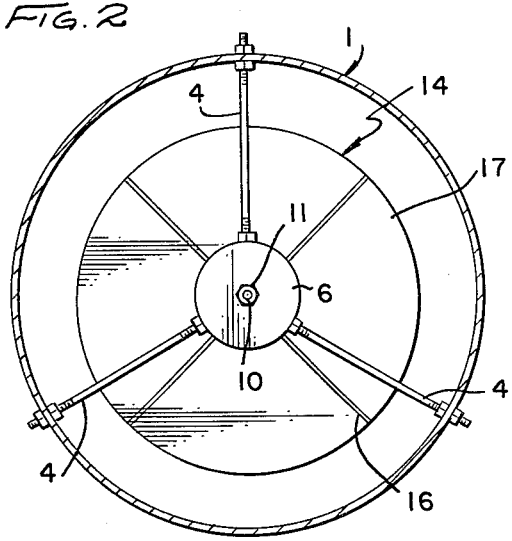
FIG. 2 is a cross-sectional view taken along line 2—2 of FIG. 1 showing the outermost end of the structure of this invention.

Referring to the drawings, there is shown in FIG. 1 a gas passage duct 1 which is in the shape of an elongated cylindrical shell. The duct 1 may be incorporated within a building or other enclosure, or may be included within a movable vehicle, such as aircraft. In cross-section, the duct 1 may comprise any conventional shape, such as circular, square, rectangular, octagonal, and so forth. The duct 1 may vary in length and cross-sectional size. Also, within the scope of the invention the duct 1 may have a complex form or shape such as that of a gas turbine inlet or exhaust duct. It is to be understood that the duct 1 will normally be constructed of a rigid material, such as sheet metal.

Secured to the duct 1 are forward mounting bracket assemblies 2 and 3. The assembly 2 includes a plurality of spaced apart rods 4 which, in this particular instance, is shown to be three in number. The rods 4 are radially spaced in respect to a center opening 5 formed within a plate 6. The rods 4 are attached to the plate 6.

The mounting bracket assembly 3 is formed in an identical manner including rods 7 which are secured to a plate 8. The plate 8 includes a center opening 9.

The free end of the rods 4 and 7 extend through the wall of the duct 1. The free end of each of the rods 4 and 7 is threaded and the threaded ends of the rods connect with conventional nut fasteners thereby fixedly securing the mounting assemblies 2 and 3 to the duct 1.

A rod 10 which has threaded ends is fixedly secured by conventional nuts 11 and 12 to plates 6 and 8, respectively. The rod 10 passess through an elongated opening 13 of a sound absorbing structure 14. It is to be noted that the sound absorbing structure 14 is free to rotate upon the rod 10.

Figure 3:
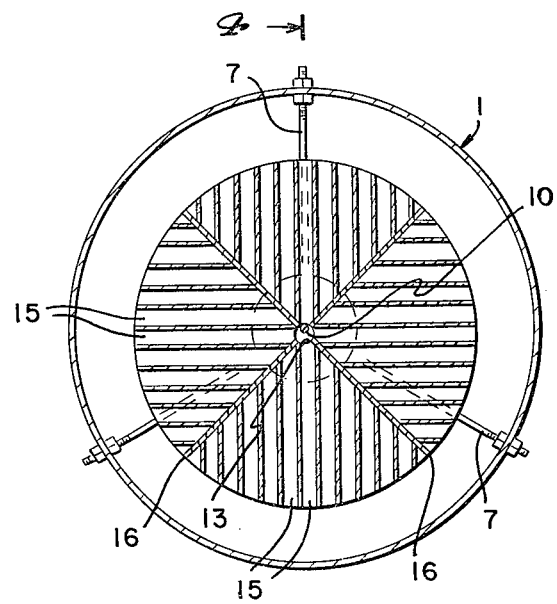
FIG. 3 is a cross-sectional view taken along line 3—3 of FIG. 1 taken approximately through the mid-point of the length of the structure of this invention.

The structure 14 is composed of a substantial number of elongated cells or acoustical waveguides 15. The structure 14 is composed of four separate elongated quadrants as may be readily seen in FIGS. 3 and 5. Each of the quadrants is defined by a pair of right angularly located plates 16. One side of a plate 16 terminates a portion of the cells 15 of one quadrant and the other side of the same plate will terminate a portion of the waveguides 15 of an adjoining quadrant.

Regarding the placement and arrangement of each of the waveguides or cells 15, reference should be made to the aforementioned U.S. Pat. No. 3,913,702 entitled CELLULAR SOUND ABSORPTIVE STRUCTURE. It is to be noted that the angular relationship between the plate 16 and the longitudinal center axis of each of the waveguides 15 is at a forty-five degree angle. The preferable range of angles is between forty-five degrees and sixty degrees.

Figure 4:
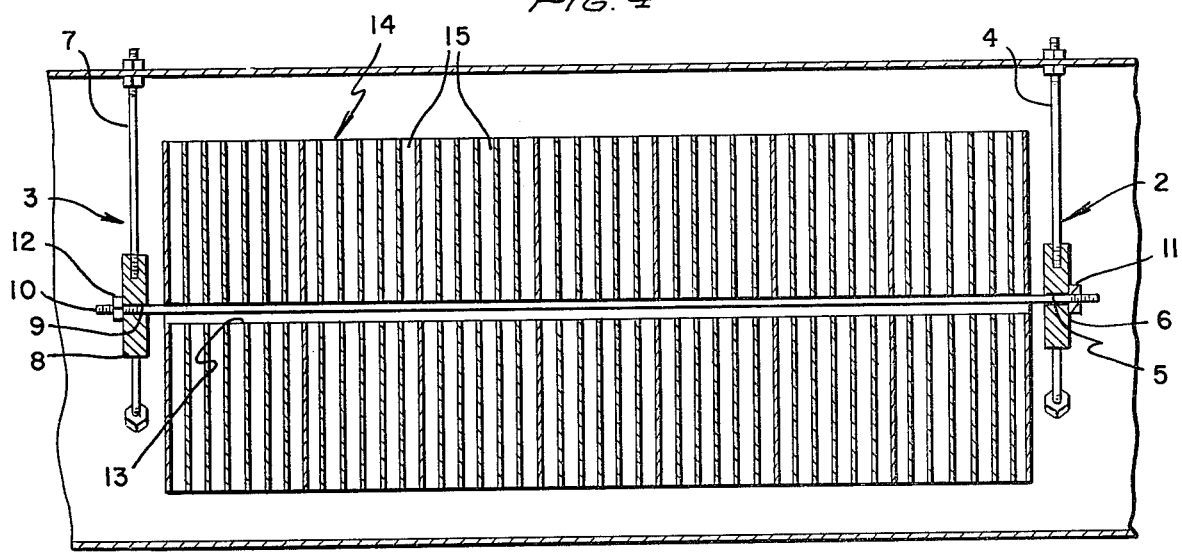
FIG. 4 is a longitudinal cross-sectional view taken along line 4—4 of FIG. 3.

It is further to be noted, by referring to FIGS. 4 and 5, that the sound absorber structure 14 is constructed of a plurality of separate segments interconnected together forming the overall structural unit. If desired, the device may be constructed as a solid, single unit.

Referring to FIGS. 1 through 5 of the drawings, note that the sound absorber 14 merely rests upon the rod 10. As the air or gas passes through the duct 1, the sound propagating in the gas passing through the duct 1 is substantially absorbed by the absorber structure 14.

If the gas passing through the duct 1 includes dust or dirt, the dust or dirt would tend to fall within the cells or waveguides that are open in the upward direction and will tend to accumulate within these cells. This, in turn, will make the structure 14 "top heavy". After a certain amount of the accumulation, the "top heavy" structure 14 will pivotally turn about the rod 10. This pivoting will continue until the structure has rotated approximately one hundred and eighty degrees. Therefore, the structure 14 will then automatically cause the accumulated dirt to fall from the cells or waveguides 15 and drop to the lower surface of the duct 1. This procedure is also applicable to not only dirt and dust, but for any liquid which may accumulate within the cells, such as oil or water. This self-emptying action is aided by the air turbulence and vibration normally present in the environment of a sound attenuating duct.

It may be desirable to have the structure 14 continuously rotate as the gas passes through the duct. To achieve this end, reference is to be had to FIGS. 6 and 7 in which the end plate 17 of the structure 14 has attached thereto a plurality of fins 18. It is to be noted that there are four in number of fins 18 employed but it is to be understood that this number could be increased or decreased. The fins 18 are merely air deflecting devices which are to extend within the air flow passage surrounding the structure 14. The fins 18 are fixedly secured to the end plate 17. The fins 18 are bent or canted at an angle in respect to the direction of movement of the air through the duct 1.

It is also considered to be within the scope of this invention to drive the structure 14 by a motor or other similar driving mechanism if it is desired.

The sound absorber of this invention is designed primarily for wet and/or dirty environments. Within such environments, the conventional fibrous or porous type of sound absorber becomes substantially less effective within a short period of time.

The cross-sectional area of the structure 14 determines the frequency scale of sound absorption. The length of the absorber determines the amount of attenuation.

What is claimed is:

1. In combination with a duct for the flow of a gas therethrough, a self-cleaning sound absorption structure located within said duct, comprising:
    an elongated resonant absorber member having an exterior sound receiving surface spaced from the interior wall of said duct, said surface having apertures which present a substantially unrestricted path into said absorber member for contaminants impinging on said surface; and
    means for rotatably mounting said absorber member about its major axis within said duct to allow said contaminants to freely exit from said apertuers as said absorber member rotates, thereby cleaning said absorber member of said contaminants.

2. The apparatus defined in claim 1 wherein said absorber member includes:
    at least one air deflecting fin mounted upon said absorber member and extending radially from said major axis, said fin being canted with respect to the direction of gas flow through said duct so as to result in rotation of said absorber when gas flows therethrough.

3. The apparatus as defined in claim 1 wherein said absorber member includes:
    a plurality of waveguide arrays, each array comprising a plurality of side-by-side acoustical waveguides of non-uniform length so as to have differing resonant frequencies and having adjacent open ends defining the sound receiving end of the array, said open ends being located along the exterior sound receiving surface of said member.

4. A self-cleaning sound absorbing structure, located within a duct for the passing of gas therethrough, comprising:
    a plurality of waveguide arrays each comprising a plurality of resonant side-by-side acoustic waveguides of non-uniform length and having adjacent open ends defining the sound receiving end of each said array, said open ends being located at the exterior surface of said structure and presenting a substantially unrestricted path into said absorbing structure for contaminants impinging on said surface; and
    means for rotatably mounting said structure to allow said contaminants to freely exit from said open ends as said absorbing structure rotates, thereby cleaning said absorbing structure of said contaminants.

5. The structure as defined in claim 4 wherein said means for rotatably mounting said structure comprises:
   means defining an elongated opening extending through said structure; and
   a thin rod extending through said opening in a loose fitting manner to facilitate rotational movement of said structure with respect to said rod.

6. The structure as defined in claim 5 wherein said means for rotation further includes:
   gas deflection means secured to said structure and extending within the gas passage located about said structure, whereby as gas is moved about said exterior surface of said structure the gas deflection means is impinged by a portion of the gas to cause said structure to rotate upon said rod.

* * * * *